(12) United States Patent
Ding et al.

(10) Patent No.: US 12,321,581 B2
(45) Date of Patent: Jun. 3, 2025

(54) INFORMATION DISPLAY METHOD AND APPARATUS, DEVICE, AND MEDIUM

(71) Applicant: Beijing Bytedance Network Technology Co., Ltd., Beijing (CN)

(72) Inventors: Huayong Ding, Beijing (CN); Wenbo Wang, Beijing (CN); Guiyan Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/671,700

(22) Filed: May 22, 2024

(65) Prior Publication Data

US 2024/0310989 A1    Sep. 19, 2024

Related U.S. Application Data

(63) Continuation of application No. PCT/CN2022/141135, filed on Dec. 22, 2022.

(30) Foreign Application Priority Data

Jan. 21, 2022    (CN) .......................... 202210072411.6

(51) Int. Cl.
G06F 3/04845    (2022.01)
G06F 3/0483     (2013.01)

(52) U.S. Cl.
CPC ........ *G06F 3/04845* (2013.01); *G06F 3/0483* (2013.01)

(58) Field of Classification Search
CPC .......................... G06F 3/04845; G06F 3/0483
See application file for complete search history.

(56) References Cited

U.S. PATENT DOCUMENTS 11,137,904 B1 * 10/2021 Tyler ..................... G06F 3/0485
11,853,526 B2 * 12/2023 Niu ........................ H04M 1/725
(Continued)

FOREIGN PATENT DOCUMENTS

CN    102375650 A    3/2012
CN    104267934 A    1/2015
(Continued)

OTHER PUBLICATIONS

Pan J, Information Display Method And Device And Electronic Device, 2019, State Intellectual Property Office of the People's Republic of China, 25 pages.*

(Continued)

*Primary Examiner* — Linh K Pham
(74) *Attorney, Agent, or Firm* — Astute IP Law Group

(57) ABSTRACT

An information display method and apparatus, a device, and a medium comprising: displaying at least two initial information cards on an information flow page comprising a plurality of rows of the initial information cards, and at least one row of more than two initial information cards; in response to a target sliding unit of a first sliding operation in a preset direction, determining a card to be removed of the at least two initial information cards, and sliding the card to be removed out of the information flow page in the preset direction; determining at least one target information card according to the target sliding unit; and sliding other cards except the card to be removed in the preset direction, and sliding the at least one target information card into the information flow page in the preset direction until the at least one target information card is completely displayed.

20 Claims, 8 Drawing Sheets

(56) References Cited

U.S. PATENT DOCUMENTS

| | | | |
|---|---|---|---|
| 11,977,719 B2* | 5/2024 | Tu | G06F 16/904 |
| 2014/0096052 A1* | 4/2014 | Aoshima | G06F 3/0486 |
| | | | 715/769 |
| 2014/0380375 A1* | 12/2014 | Yan | H04N 21/47202 |
| | | | 725/52 |
| 2018/0181295 A1* | 6/2018 | Yu | G06F 3/04883 |
| 2021/0073298 A1 | 3/2021 | Cai | |
| 2022/0188131 A1* | 6/2022 | Song | G06F 3/04883 |
| 2022/0284479 A1* | 9/2022 | Sun | G06Q 30/0269 |
| 2022/0404951 A1* | 12/2022 | Zhao | G06F 3/0482 |
| 2023/0004673 A1* | 1/2023 | Huang | G06F 16/9577 |
| 2023/0412723 A1* | 12/2023 | Xu | H04M 1/72451 |

FOREIGN PATENT DOCUMENTS

| | | | | |
|---|---|---|---|---|
| CN | 105739843 A | | 7/2016 | |
| CN | 108646972 A | | 10/2018 | |
| CN | 105739843 B | * | 3/2019 | G06F 3/0484 |
| CN | 110825997 A | | 2/2020 | |
| CN | 111432264 A | | 7/2020 | |
| CN | 111586464 A | | 8/2020 | |
| CN | 112543365 A | | 3/2021 | |
| CN | 112578962 A | | 3/2021 | |
| CN | 113138827 A | | 7/2021 | |
| CN | 114416261 A | | 4/2022 | |
| CN | 115480629 A | * | 12/2022 | G06F 3/017 |
| WO | WO-2016091087 A1 | * | 6/2016 | G06F 3/0484 |
| WO | 2021037171 A1 | | 3/2021 | |

OTHER PUBLICATIONS

International Search Report for PCT/CN2022/141135, mailed Mar. 7, 2023, 7 pages.

Office Action for Chinese Patent Application No. 202210072411.6, mailed May 28, 2023, 15 pages.

Extended European Search Report for European Patent Application No. 22921715.3, mailed Jan. 23, 2025, 9 pages.

* cited by examiner

INFORMATION DISPLAY METHOD AND APPARATUS, DEVICE, AND MEDIUM

CROSS-REFERENCE TO RELATED APPLICATIONS

The present application is a continuation application of International Application No. PCT/CN2022/141135, filed on Dec. 22, 2022, which claims priority to Chinese Patent Application No. 202210072411.6 filed on Jan. 21, 2022, the disclosure of both applications is incorporated by reference herein in their entirety.

TECHNICAL FIELD

The present disclosure relates to the field of information processing technologies, and in particular to an information presentation method and apparatus, a device, and a medium.

BACKGROUND

With the development of applications and computer technologies, more and more users browse various information through the applications. The applications can attract the user to select information of interest for continuous browsing by presenting preview (feed) information stream to the user. At present, the above preview information stream is usually presented in a top-down direction.

SUMMARY

An embodiment of the present disclosure provides an information presentation method, which comprises:
  presenting at least two initial information cards on an information stream page, the information stream page comprising a plurality of rows consisting of the initial information cards, at least one of the plurality of rows consisting of two or more said initial information cards;
  determining, in response to a first slide operation in a preset direction, a to-be-moved-out card among the at least two initial information cards according to a target slide unit corresponding to the first slide operation, and sliding the to-be-moved-out card out of the information stream page in the preset direction;
  determining at least one target information card according to the target slide unit;
  sliding cards other than the to-be-moved-out card among the at least two initial information cards by the target slide unit in the preset direction, and sliding the at least one target information card into the information stream page in the present direction until the at least one target information card is completely presented.

An embodiment of the present disclosure further provides an information presentation apparatus, which includes:
  a presentation module for presenting at least two initial information cards on an information stream page, the information stream page comprising a plurality of rows consisting of the initial information cards, at least one of the plurality of rows consisting of two or more said initial information cards;
  a slide-out module for determining, in response to a first slide operation in a preset direction, a to-be-moved-out card among the at least two initial information cards according to a target slide unit corresponding to the first slide operation, and sliding the to-be-moved-out card out of the information stream page in the preset direction;
  a determination module for determining at least one target information card according to the target slide unit;
  a slide-in module for sliding cards other than the to-be-moved-out card among the at least two initial information cards by the target slide unit in the preset direction, and sliding the at least one target information card into the information stream page in the present direction until the at least one target information card is completely presented.

An embodiment of the present disclosure further provides an electronic device, which includes: a memory; and a processor coupled to the memory, which is configured to execute the information presentation method as provided by the embodiment of the present disclosure, based on instructions stored in the memory.

An embodiment of the present disclosure further provides a computer readable storage medium, wherein the storage medium stores a computer program, which is used for executing the information presentation method as provided by the embodiment of the present disclosure.

An embodiment of the present disclosure further provides a computer program, including: instructions which, when executed by a processor, cause the processor to execute the information presentation method as provided by the embodiment of the present disclosure.

BRIEF DESCRIPTION OF THE DRAWINGS

The above and other features, advantages, and aspects of various embodiments of the present disclosure will become more apparent by referring to the following specific implementations when taken in conjunction with the accompanying drawings. Throughout the drawings, identical or similar reference signs refer to identical or similar elements. It should be understood that the drawings are schematic and that components and elements are not necessarily drawn to scale.

DETAILED DESCRIPTION

Figure 1:
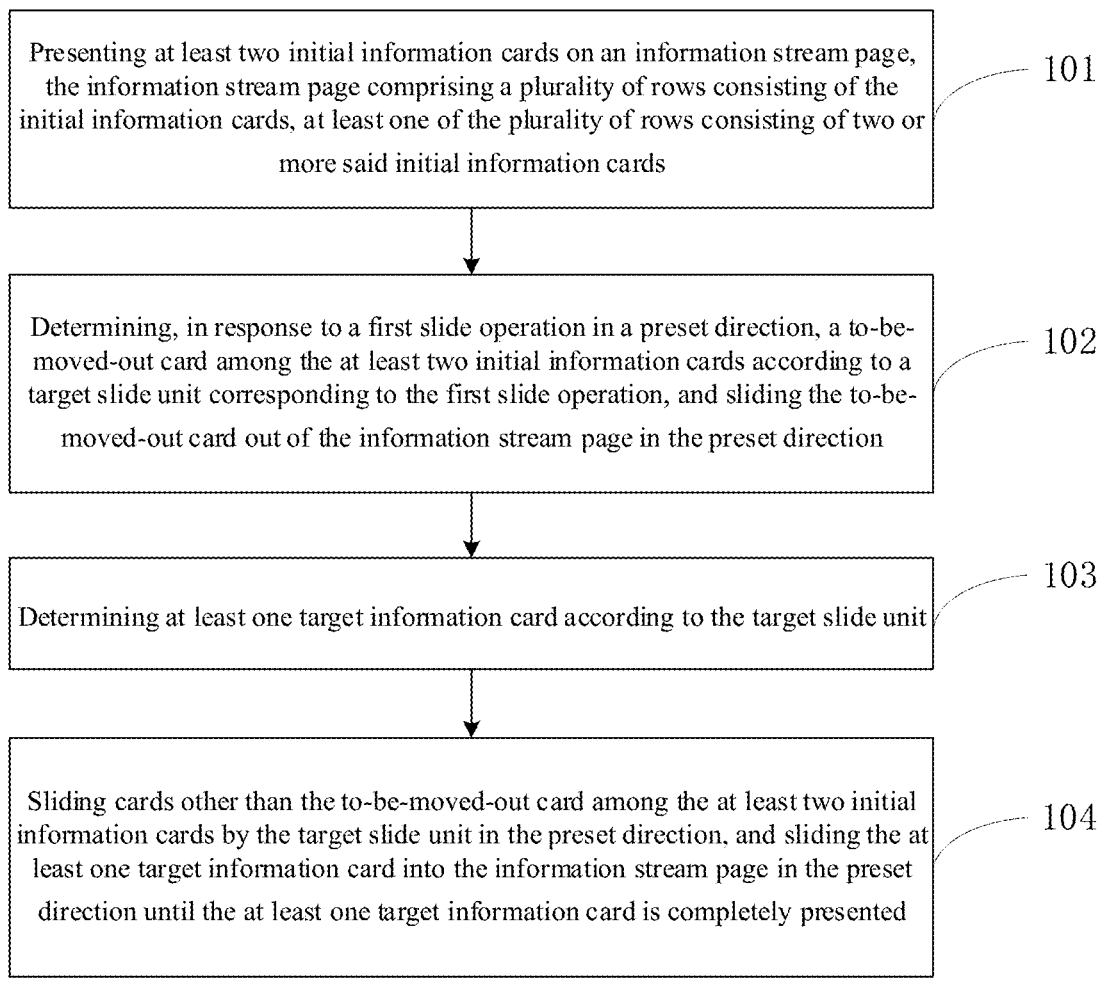
FIG. 1 is a schematic flow diagram of an information presentation method provided by an embodiment of the present disclosure.

Embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, but rather are provided for a more thorough and complete understanding of the present disclosure. It should be understood that the drawings and the embodiments of the present disclosure are for illustration purposes only and are not intended to limit the protection scope of the present disclosure.

It should be understood that the various steps recited in method implementations of the present disclosure can be executed in a different order, and/or executed in parallel. Moreover, method implementations can include additional steps and/or omit executing the illustrated steps. The scope of the present disclosure is not limited in this respect.

The term "including" and variations thereof as used herein are intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that "first", "second", and other concepts mentioned in the present disclosure are only used for distinguishing different means, modules or units, and are not used for limiting the order or interdependence relations of the functions performed by the means, modules or units.

It should be noted that references to "one" or "a plurality of" in the present disclosure are intended to be illustrative rather than limiting, and that those skilled in the art should understand they should be understood as "one or more" unless the context clearly indicates otherwise.

The names of messages or information exchanged between a plurality of means in the implementations of the present disclosure are for illustrative purposes only, and are not intended to limit the scope of these messages or information.

The information presentation method of the embodiment of the present disclosure is mainly adapted for scenes of presenting information streams, for example, a scene of presenting a preview information stream, or a scene of presenting a detail information stream. The information presentation method provided by the embodiment of the present disclosure can be executed by an information presentation apparatus, wherein the apparatus can be implemented by software and/or hardware, and the apparatus can be integrated into an electronic device with a video playing function, for example, a mobile phone, a palmtop computer, a tablet computer, a notebook computer, or a desktop computer.

At present, the above preview information stream is usually presented in a top-down direction. The presentation direction is relatively monotonous, and the requirements of the user to browse in other directions cannot be met; moreover, the presentation position of information is fixed, and a problem that partial information is cut possibly exists, which results in a poor presentation effect of the preview information stream. In order to solve the above technical problem, the present disclosure provides an information presentation method and apparatus, a device, and a medium.

FIG. 1 is a schematic flow diagram of an information presentation method provided by an embodiment of the present disclosure. As shown in FIG. 1, the information presentation method specifically includes the following steps.

Step 101, presenting at least two initial information cards on an information stream page, the information stream page comprising a plurality of rows consisting of the initial information cards, at least one of the plurality of rows consisting of two or more said initial information cards.

The information stream page can be a page for presenting information streams to a user in an application. In some embodiments, the information stream page can be a preview information stream page, a detail information stream page, or the like, for different types of information, such as videos, texts, or images. The information card can be a manner of presenting information in form of a card, and one information card corresponds to one piece of information. The format of information is not limited, for example, information can be videos, texts, images, or the like. The initial information card can be understood as an information card currently presented on the information stream page, and sizes of different initial information cards can be the same or different.

Specifically, the information presentation apparatus can load an information stream page to be presented to the user, where at least two initial information cards are presented on the information stream page, the information stream page includes a plurality of rows consisting of the initial information cards, and the plurality of rows consist of two or more initial information cards, that is, at least one row of the information stream page presents two or more initial information cards. The at least two initial information cards can be presented in a multi-row and multi-column form on the information stream page. The rows can include at least one row, the number of columns in a different row can be the same or different. The columns in at least one target row include at least two columns, that is, the target row consists of at least two initial information cards, and the target row includes one or more target rows. The columns in rows other than the target row include one column, that is, only one initial information card is presented. It is understood that, when the rows include only one row, then only one row is presented on the information stream page, and the row consists of at least two initial information cards.

Figure 2:
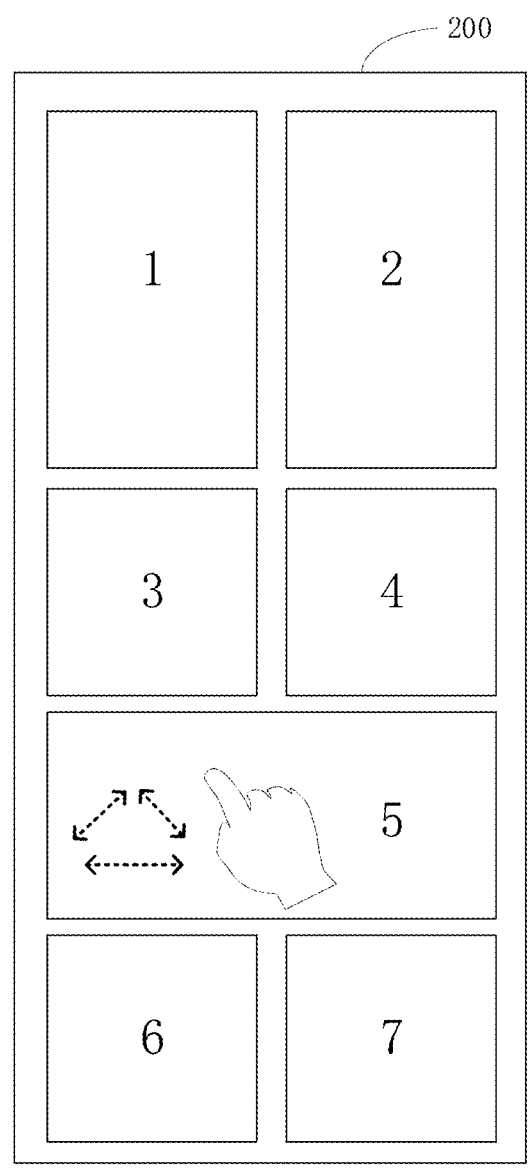
FIG. 2 is a schematic diagram of an information presentation provided by an embodiment of the present disclosure.

Illustratively, FIG. 2 is a schematic diagram of an information presentation provided by an embodiment of the present disclosure. As shown in FIG. 2, an information stream page 200 is presented, where the information stream page 200 includes 7 initial information cards. In each of a first row, a second row, and a fourth row, there are two columns and two initial information cards are presented, and in a third row, one initial information card is presented. It can be understood that FIG. 2 is merely one example of the information stream page and is not intended to be limiting.

Step 102, determining, in response to a first slide operation in a preset direction, a to-be-moved-out card among the at least two initial information cards according to a target slide unit corresponding to the first slide operation, and sliding the to-be-moved-out card out of the information stream page in the preset direction.

The first slide operation is directed to a slide operation in a preset direction which is triggered by a user. The target slide unit can be understood as a slide unit set for a slide operation of a user. In the embodiments of the present disclosure, the target slide unit can include a fixed slide distance, a real-time slide distance, or a card group. The fixed slide distance can be understood as a preset unit distance, and a fixed slide unit is taken as a unit for sliding regardless of an actual distance of the slide operation of the user. The fixed slide distance is smaller than or equal to a size of the information stream page in a preset direction, for example, when the preset direction is leftwards or rightwards, the size of the information stream page in the preset direction is a width of the information stream page; and when the preset direction is an oblique direction, the size of the information stream page in the preset direction is an oblique length of the information stream page. The real-time slide distance is a real-time distance corresponding to the slide operation of the user. When the target slide unit is a fixed slide distance or a real-time slide distance, the preset direction can include a leftward, rightward, or oblique direction.

In some embodiments, determining a to-be-moved-out card among the at least two initial information cards according to a target slide unit can include: determining an initial information card among the at least two initial information cards, of which at least partial region is within the target slide unit, as the to-be-moved-out card. The to-be-moved-out card can be understood as an information card, which needs to be removed out of the page, among the at least two initial information cards presented on the above information stream page. The partial region can be any one region with an area larger than zero, and can be specifically set according to an actual situation, for example, the partial region can be a third of the region, a half of the region, the whole region, or the like.

Specifically, after the information presentation apparatus presents at least two initial information cards on the information stream page, a trigger operation of the user can be detected. When a first slide operation of the user is received, a boundary of the information stream page in the preset direction can be taken as a start line. For example, when the preset direction is leftwards, the boundary in the preset direction is a left boundary, and when the preset direction is an oblique direction, the boundary in the preset direction is two boundaries in the oblique direction. The start line, after it is moved by the above target slide unit in a reverse direction of the preset direction, is taken as an end line, and if at least partial region of an initial information card is between the start line and the end line, then the initial information card is determined to be within the target slide unit, that is, the initial information card is a to-be-moved-out card; if the region of an initial information card between the start line and the end line is smaller than the above partial region, then the initial information card is not a to-be-moved-out card. After the to-be-moved-out card is determined, the information presentation apparatus can slide the to-be-moved-out card out of the above information stream page in the preset direction until the to-be-moved-out card is completely slid out.

Figure 3:
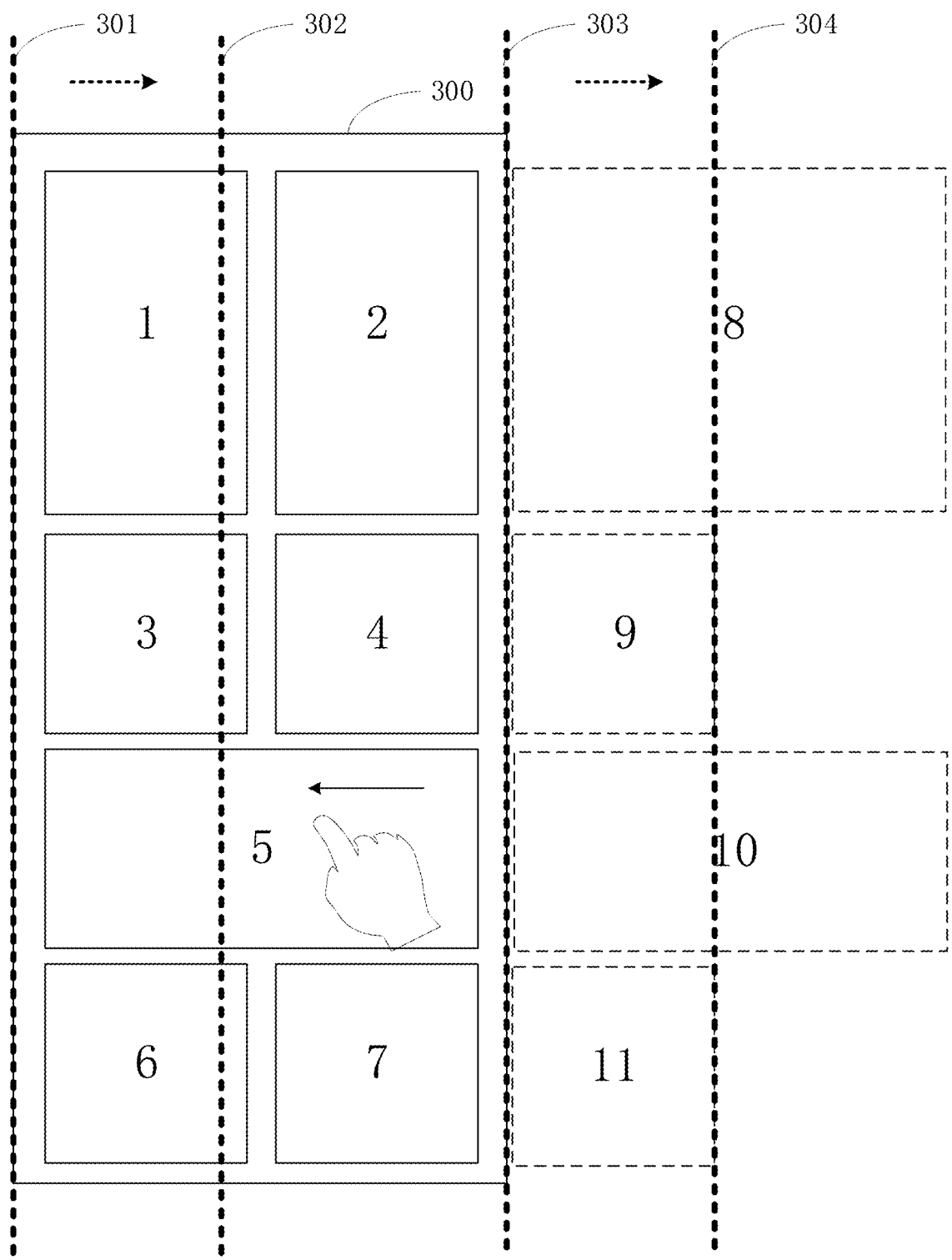
FIG. 3 is a schematic diagram of another information presentation provided by an embodiment of the present disclosure.

Illustratively, FIG. 3 is a schematic diagram of another information presentation provided by an embodiment of the present disclosure. As shown in FIG. 3, an information stream page 300 is presented, where the information stream page 300 is the same as the information stream page 200 in FIG. 2. In the figure, a solid arrow indicates that a preset direction is leftwards, and a start line 301 is at a left boundary of the information stream page. A target slide unit can be a fixed slide distance, for example, the fixed slide distance can be equal to a width of an initial information card with a smaller size in the figure. The start line 301 is moved rightwards by the target slide unit to obtain an end line 302. A dashed arrow indicates a slide direction of the start line 301. When the partial region is a third of the region, then at least the partial regions of the initial information cards 1, 3, 5, 6 are determined to be between the start line 301 and the end line 302, that is, the initial information cards 1, 3, 5, 6 are within the target slide unit and determined as the to-be-moved-out cards.

When the target slide unit is a real-time slide distance, the to-be-moved-out card can be understood as an initial information card among the at least two initial information cards presented on the above information stream page, of which a region slid out of the information stream page after it is slid by the above real-time slide distance in the preset direction is at least the partial region.

The above card group can be a set consisting of a plurality of information cards, and a size of a card group as combined is the same as the size of the information stream page. When the target slide unit is the card group, the preset direction is unlimited, that is, the preset direction can include an upward, downward, leftward, rightward, or oblique direction. When the target slide unit is the card group, the to-be-moved-out card includes at least two initial information cards currently presented on the information stream page, that is, the at least two initial information cards form a card group, and the entirety of this card group is to-be-moved-out card.

Step 103, determining at least one target information card according to the target slide unit.

The target information card can be understood as an information card among the preloaded information cards, which is about to be presented on the information stream page. The preloaded information card can be an information card for which preloading is completed for an information stream page, and the preloaded information card has been downloaded and rendered, which can be directly presented without being loaded in real time.

In some embodiments, determining at least one target information card according to the target slide unit can include: determining a preloaded information card among the plurality of preloaded information cards in the preset direction, of which at least partial region is within the target slide unit, as the target information card. The partial region can be any region with an area larger than zero, and can be specifically set according to an actual situation. The plurality of preloaded information cards in the preset direction can be a plurality of preloaded information cards which are about to be slid in the preset direction, that is, a plurality of preloaded information cards of the information stream page in a reverse direction of the preset direction. For example, when the preset direction is leftwards, the plurality of preloaded information cards in the preset direction are a plurality of preloaded information cards rightwards of the information stream page, and these preloaded information cards are about to be slid leftwards.

Specifically, for the above first slide operation, the information presentation apparatus can acquire a plurality of preloaded information cards in a preset direction corresponding to the first slide operation; take a boundary of the information stream page in a reverse direction of the preset direction as a start line, for example, when the preset direction is leftwards, the boundary in the reverse direction of the preset direction is a right boundary, and when the preset direction is an oblique direction, the boundary in the preset direction is two oblique boundaries in the reverse directions; and take the start line, after it is moved by the above target slide unit in a reverse direction of the preset direction, as an end line, and if at least partial region of a preloaded information card is between the start line and the end line, then determine that the preloaded information card is within the target slide unit, that is, the preloaded information card is the target information card.

Illustratively, as shown in FIG. 3, in the figure, a solid arrow indicates that the preset direction is leftwards, the plurality of preloaded information cards in the preset direction are a plurality of preloaded information cards rightwards of the information stream page. A dashed region indicates preloaded information cards that have not yet been presented on the information stream page, such as preloaded information cards 8, 9, 10, 11. The start line 303 is at the right boundary of the information stream page. The target slide unit can be a fixed slide distance, for example, the fixed slide distance can be equal to a width of the initial information card with a smaller size in the figure. The start line 303 is moved rightwards by the target slide unit to obtain the end line 304. A dashed arrow indicates a slide direction of the start line 303. When the partial region is a third of the region, at least the partial regions of the preloaded information cards 8, 9, 10, 11 are determined to be between the start line 303 and the end line 304, that is, the preloaded information cards 8, 9, 10, 11 are within the target slide unit and are the target information cards.

When the target slide unit is a real-time slide distance, the target information card can be a preloaded information card among the plurality of preloaded information cards in the preset direction, of which a region displayed on the information stream page after it is slid by the above real-time slide distance in the preset direction is at least the partial region.

In some embodiments, there are a plurality of pre-loaded information cards in any direction of the information stream page. The plurality of preloaded information cards are combined into at least one card group according to a size of the information stream page. The card group includes at least one preloaded information card, and a size of the preloaded information card is smaller than or equal to that of the information stream page. The preloaded information card can be an information card for which preloading is completed for the information stream page, where the information card can be loaded unlimitedly or loaded according to a preset number. There is at least one card group in any one direction of the information stream page.

Figure 4:
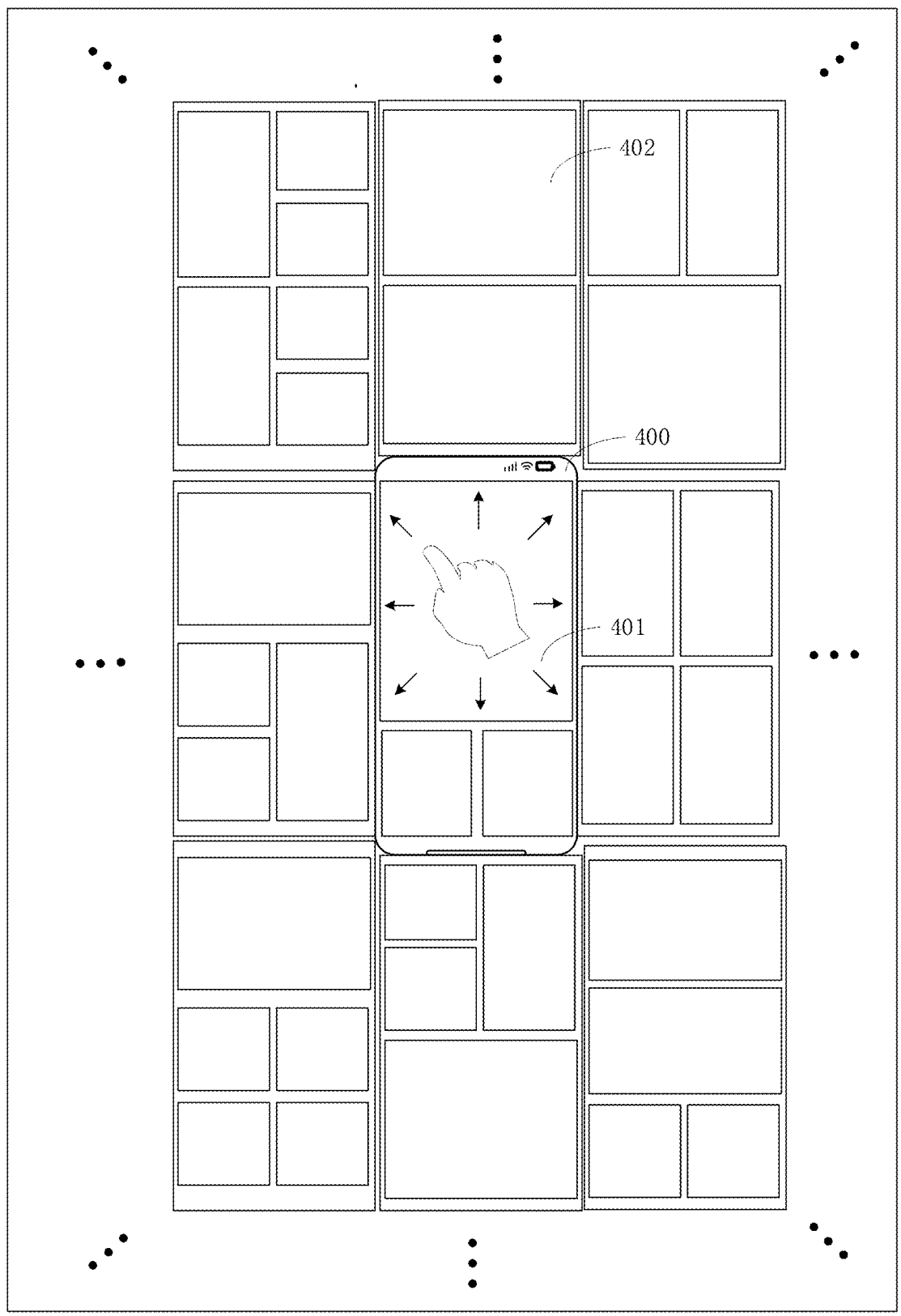
FIG. 4 is a schematic diagram of yet another information presentation provided by an embodiment of the present disclosure.

Illustratively, FIG. 4 is a schematic diagram of yet another information presentation provided by an embodiment of the present disclosure. As shown in FIG. 4, a current information stream page 400 is presented, as well as a card group of the information stream page in each direction. In the figure, 8 card groups in leftward, rightward, upward, downward and oblique directions are respectively presented, and the oblique direction can include upper left, upper right, lower left and lower right directions. As shown in FIG. 4, the number, size, and arrangement direction of the preloaded information cards in a different card group can be flexibly combined according to the size of the information stream page. A card group upwards as shown includes two preloaded information cards with the same size, and a card group downwards includes four preloaded information cards with different sizes. It can be understood that the card group in each direction of the information stream page in FIG. 4 is exemplary only, and not limiting.

When the target slide unit is a card group, a target information card includes preloaded information cards in a next card group in the preset direction. The next card group in the preset direction can be a next card group which is about to be slid in the preset direction, that is, a next card group of the information stream page in a reverse direction of the preset direction. For example, when the preset direction is downwards with reference to FIG. 4, a next card group 402 upwards of the information stream page can be determined as the next card group in the preset direction, that is, all the preloaded information cards in the next card group 402 can be determined as target information cards.

Step 104, sliding cards other than the to-be-moved-out card among the at least two initial information cards by the target slide unit in the preset direction, and sliding the at least one target information card into the information stream page in the preset direction until the at least one target information card is completely presented.

In the embodiment of the present disclosure, after determining at least one target information card according to the target slide unit, the information presentation apparatus can slide cards other than the to-be-moved-out card among the at least two initial information cards by the above target slide unit in the preset direction, and slide the at least one target information card into the information stream page in the preset direction. Each target information card can stop sliding when it has been completely presented after being slid by the target slide unit in the preset direction; otherwise, sliding can be continued until each target information card can be completely presented on the information stream page, and then sliding is stopped. The information card not only can be slid in a unit of the target slide unit but also can be completely presented in a self-adaptive manner without being cut.

It is to be noted that, a first card of the cards other than the to-be-moved-out card among the at least two initial information cards can stop sliding after being slid by the target slide unit, and the first card is a card of the cards other than the to-be-moved-out card, which is not in the same row as the target information card. A second card of the cards other than the to-be-moved-out card can be slid out of the information stream page due to complete presentation of the target information card, and the second card is a card of the cards other than the to-be-moved-out card, which is in the same row as the target information card. The number of the first card(s) or the second card(s) can be zero or any number larger than zero. If all of the at least two initial information cards are determined as to-be-moved-out cards, then the information presentation apparatus can slide only the target information card and completely present it in a self-adaptive manner.

Figure 5:
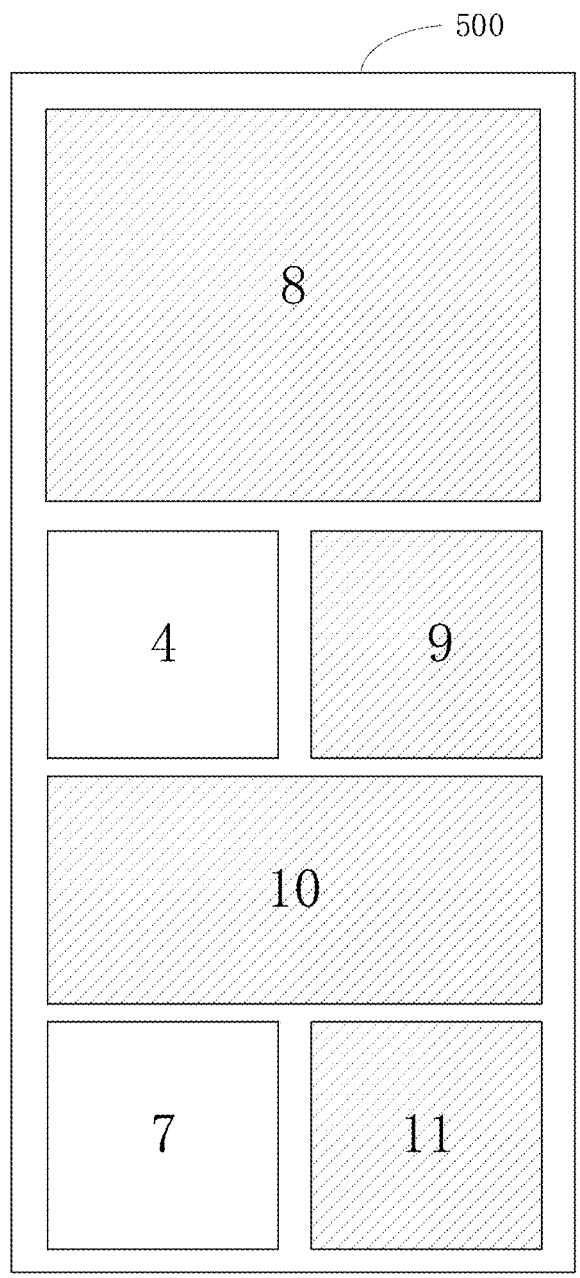
FIG. 5 is a schematic diagram of yet another information presentation provided by an embodiment of the present disclosure.

Illustratively, FIG. 5 is a schematic diagram of yet another information presentation provided by an embodiment of the present disclosure. As shown in FIG. 5, on a basis of the information stream page 300 of FIG. 3, FIG. 5 shows an information stream page 500 after being subject to a leftward first slide operation, wherein the target slide unit can be a fixed slide distance. For example, the fixed slide distance is equal to a width of an initial information card with a smaller size in the figure, where, at least partial regions of the initial information cards 1, 3, 5, 6 in FIG. 3 are determined to be within the target slide unit, that is, initial information cards 1, 3, 5, 6 are to-be-moved-out cards. The preloaded information cards 9, 11 in FIG. 5 are located at positions of the initial information cards 4, 7 before being slid, and thus at least partial regions of the preloaded information cards 8, 9, 10, 11 in FIG. 5 are determined to be within the target slide unit, that is, the preloaded information cards 8, 9, 10, 11 are target information cards.

When a user triggers a leftward first slide operation on the information stream page 200 of FIG. 3, which is indicated by a leftward solid arrow in the figure, it is possible to slide leftwards the to-be-moved-out cards 1, 3, 5, 6 out of the information stream page, slide leftwards the initial information cards 2, 4, 7 by the above target slide unit, and slide leftwards the target information cards 8, 9, 10, 11 into the information stream page. The target information cards 9, 11 can be presented completely after sliding according to the above target slide unit, and partial regions of the target information cards 8 and 10 are not presented after being slid according to the above target slide unit, so that the target information cards 8 and 10 can be completely presented in a self-adaptive manner, and at the same time, the initial information card 2 is slid leftwards out of the information stream page 300 due to complete presentation of the target information card 8. The information stream page 500 is presented at the end.

When the target slide unit is a real-time slide distance, after the information presentation apparatus presents at least two initial information cards on the information stream page, in response to a first slide operation, it is possible to slide the at least two initial information cards and a plurality of preloaded information cards in the preset direction both by the real-time slide distance of the first slide operation in the preset direction, determine a region of each initial information card which is slid out of the information stream page, and determine the initial information card, of which the region is larger than or equal to the partial region, as a to-be-moved-out card which continues to be slid in the preset direction until being slid out of the information stream page; and determine a displayed region of the plurality of preloaded information cards after being slid by the real-time slide distance, determine the preloaded information card, of which the displayed region is larger than or equal to the partial region, as a target information card which continues to be slid in the preset direction, until the target information cards can be completely displayed. At this time, one or more of the cards other than the to-be-moved-out card among the least two initial information cards, which is not in the same row as the target information card, can stop sliding after being slid by a real-time slide distance, while one or more of the cards other than the to-be-moved-out card, which is in the same row as the target information card, can be slid out of the information stream page due to complete presentation of the target information card. In the above solution, the information card can be slid according to the real-time slide distance of the slide operation, and complete presentation of the information card can also be realized in a self-adaptive manner when slid into presentation, which ensures information to be not cut.

When the target slide unit is a card group, after the information presentation apparatus presents at least two initial information cards on the information stream page, in response to a first slide operation, it is possible to take all the initial information cards presented on the information stream page as to-be-moved-out cards, which are slid out of the information stream page in a preset direction of the first slide operation, and slide a next card group in the preset direction into the information stream page according to the slide direction and present the next card group. Since the next card group is formed according to a size of the information stream page, it can be completely presented. For example, referring to FIG. 4, when a user triggers a downward first slide operation, it is possible to move downwards the currently presented three initial information cards as a card group 401 out of the information stream page, and slide downwards a next card group 402 upwards of the information stream page into the information stream page for presentation.

In the above solution, presentation of the information cards can be switched in a unit of card group by sliding on the information stream page. A size of the card group is corresponding to that of the information stream page, that is, corresponding to a screen of a current device. Sliding of the information cards is realized in a unit of screen, information in the information cards will not be cut, and the effect of information presentation is further improved.

The information presentation solution provided by the embodiment of the present disclosure includes: presenting at least two initial information cards on an information stream page, the information stream page comprising a plurality of rows consisting of the initial information cards, and at least one of the plurality of rows consisting of two or more initial information cards; determining, in response to a first slide operation in a preset direction, a to-be-moved-out card among the at least two initial information cards according to a target slide unit corresponding to the first slide operation, and sliding the to-be-moved-out card out of the information stream page in the preset direction; determining at least one target information card according to the target slide unit; and sliding cards other than the to-be-moved-out card among the at least two initial information cards by the target slide unit in the preset direction, and sliding the at least one target information card into the information stream page in the preset direction until the at least one target information card is completely presented. By adopting the above technical solution, when there are two or more information cards presented in the same row on the information stream page and a slide operation in the preset direction on the information stream page is received, the to-be-moved-out card and the target information card can be determined according to the target slide unit, then the above to-be-moved-out card can be slid out and the target information card can be slid in until complete presentation. Not only requirements of a user to browse information in a plurality of directions can be satisfied, but also complete presentation can be realized in a self-adaptive manner during slide-in presentation regardless of a size of the information card, which ensures information to be not cut and further improves the effect of information presentation.

Figure 6:
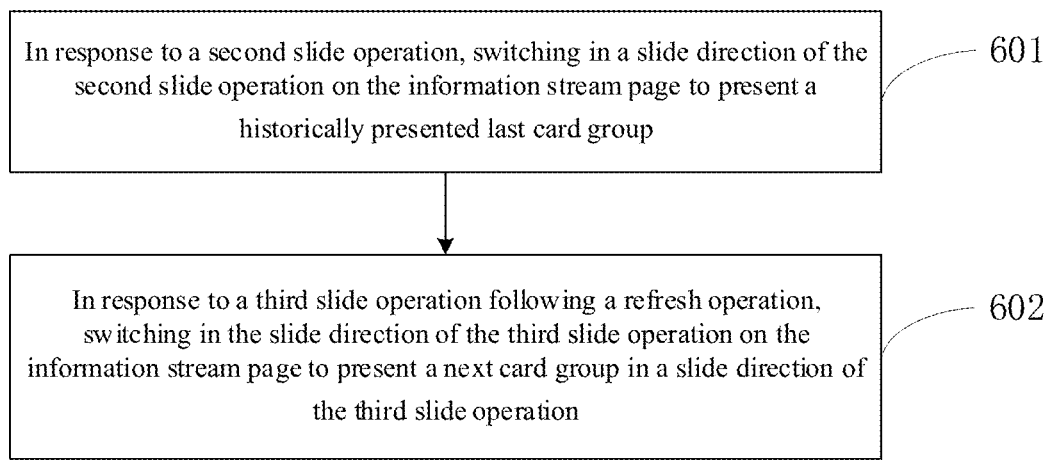
FIG. 6 is a schematic flow diagram of another information presentation method provided by the embodiment of the present disclosure.

Illustratively, FIG. 6 is a schematic flow diagram of another information presentation method provided by an embodiment of the present disclosure. As shown in FIG. 6, in a possible implementation, when the target slide unit is a card group, after the above Step 104, the information presentation method can further include at least one of the following Steps 601 or 602.

Step 601, in response to a second slide operation, switching in a slide direction of the second slide operation on the information stream page to present a historically presented last card group.

The slide direction of the second slide operation is reverse to the slide direction of the first slide operation.

Specifically, after the information presentation apparatus switches to present the information cards on the information stream page in a unit of card group in the preset direction of the first slide operation in response to the first slide operation, if a second slide operation of the user, which is reverse to the preset direction of the above first slide operation, is received, then it is possible to switch to present the last card group which has been presented, that is, the above at least two initial information cards, in the slide direction of the second slide operation, so that the user can return quickly when he wants to review the information cards that have been viewed previously.

For example, referring to FIG. 4, if, after the user triggers a downward first slide operation to present a next card group 402 upwards of the information stream page, an upward second slide operation is triggered, then the next card group 402 is slid upwards out of the information stream page, and the card group 401 of the historically presented three initial information cards is slid upwards into the information stream page to be presented as the last card group.

Step 602 can be executed after Step 601.

Step 602, in response to a third slide operation following a refresh operation, switching in the slide direction of the third slide operation on the information stream page to present a next card group in a slide direction of the third slide operation.

The slide direction of the third slide operation is reverse to the slide direction of the first slide operation, and can be the same or different from the slide direction of the above second slide operation. The refresh operation can be an operation for refreshing the preloaded information card based on the current information stream page, and a specific form of the operation can be a trigger operation for a preset refresh key, or other gesture operations, which is not limited specifically. The next card group in the slide direction of the third slide operation can be a next card group about to be slid in the slide direction of the third slide operation, that is, a next card group of the information stream page in a reverse direction of the slide direction of the third slide operation.

Specifically, after the information presentation apparatus switches to present the information cards on the information stream page in a unit of card group in the preset direction of the first slide operation, if a refresh operation of a user is received, then it is possible to refresh card groups of the information stream page in different directions, that is, refresh the card groups, which were historically presented on the information stream page, as new card groups; if a third slide operation in a direction reverse to the slide direction of the above first slide operation is received, then it is possible to slide a current card group presented on the information stream page out of the information stream page in the slide direction of the third slide operation, and slide a next card group in the slide direction of the third slide operation into the information stream page according to the slide direction for presentation. The next card group here is not a historically presented card group but a refreshed card group.

Optionally, the information presentation apparatus can also add a refresh instruction to the slide operation, determine that the refresh instruction is received in response to a third slide operation of the user, refresh the card groups of the information stream page in different directions, and switch in the slide direction of the third slide operation on the information stream page to present a next card group in the slide direction of the third slide operation.

For example, referring to FIG. 4, when a user triggers a refresh operation after triggering a downward first slide operation to present a next card group 402 upwards of an information stream page, then the historically presented card group 401 is switched to a new card group, an upward third slide operation is received, and a new next card group downwards of the information stream page is slid upwards into the information stream page for presentation.

In the above solution, when the user triggers the refresh operation firstly and then triggers the reverse slide operation in the sliding process, the refreshed information card can be presented, instead of the historically presented information card, so that the user can browse new information at any position, which better meets actual requirements of the user.

In some embodiments, after presenting at least two initial information cards on an information stream page, the information presentation method can further include: taking, in response to a fourth slide operation, the at least two initial information cards and a plurality of preloaded information cards as a whole card, and sliding and presenting the whole card on the information stream page according to a slide direction of the fourth slide operation and a real-time slide distance.

The fourth slide operation can be a slide operation in any direction, for example, the slide direction of the fourth slide operation can include leftward, rightward, upward, downward, oblique, and other directions.

Specifically, after presenting at least two initial information cards on the information stream page, the information presentation apparatus can receive a fourth slide operation triggered by a user, take the at least two initial information cards presented on the current information stream page and the plurality of preloaded information cards of the information stream page in different directions as a whole card, slide the whole card by the above real-time slide distance in the slide direction of the fourth slide operation. At this time, part of the whole card is presented on the information stream page. Since the real-time slide distance is unlimited, the information card can be completely presented or only partial region of it can be presented.

Figure 7:
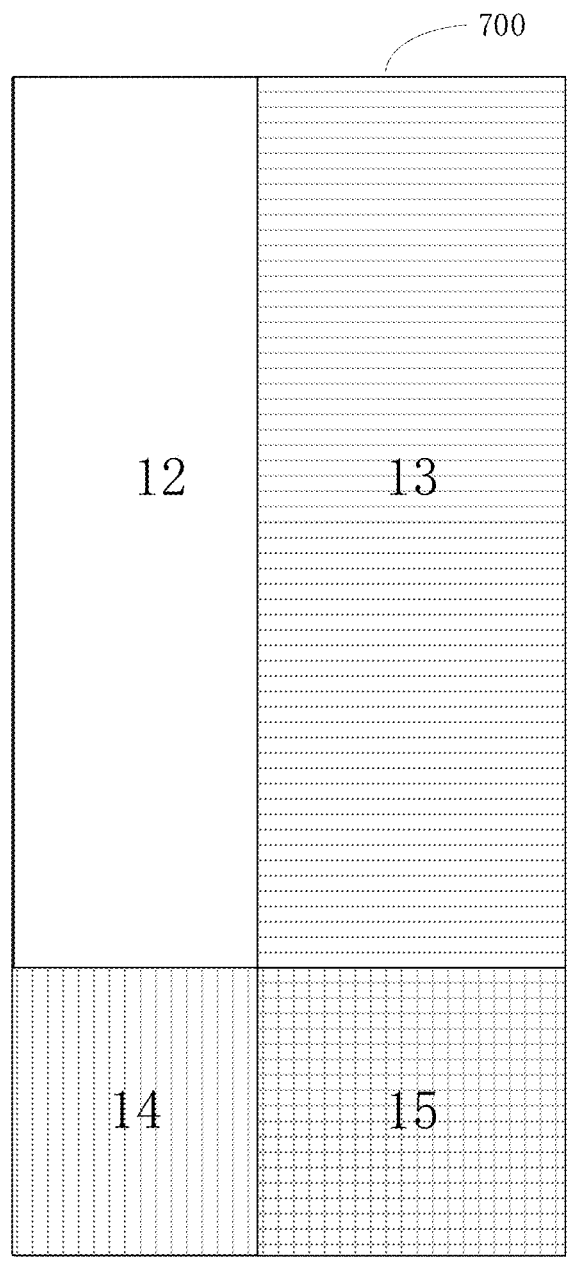
FIG. 7 is a schematic diagram of yet another information presentation provided by an embodiment of the present disclosure.

Illustratively, FIG. 7 is a schematic diagram of yet another information presentation provided by an embodiment of the present disclosure. As shown in FIG. 7, an information stream page 700 having been subject to the above fourth slide operation is showed. The information stream page in FIG. 4 and a card group formed by a combination of a plurality of preloaded cards are taken as a whole card, and part of the whole card is presented on the information stream page 700, including regions 12, 13, 14, 15 in the figure. These four differently filled regions can each represent a part from a different card group, and these four regions can include information cards with smaller sizes (not shown in FIG. 7).

In the above solution, the information card presented on the information stream page can realize a free slide with an unlimited direction and an unlimited slide distance, that is, the information cards and the preload information cards can be freely slid upwards and downwards or leftwards and rightwards, just like a car canvas, so as to switch to present new information, which further improves the flexibility and the variety of information presentation.

Figure 8:
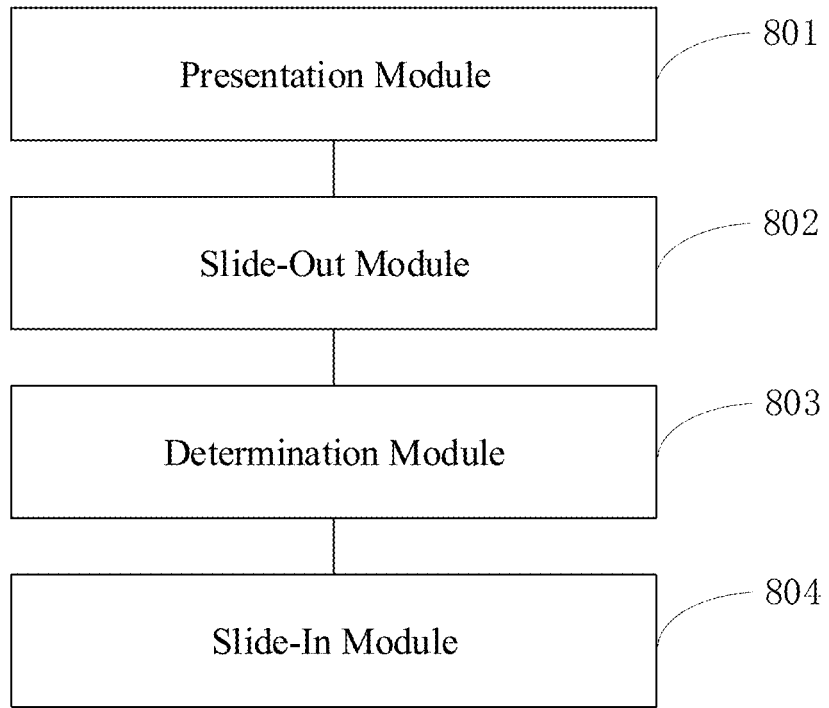
FIG. 8 is a schematic structural diagram of an information presentation apparatus provided by an embodiment of the present disclosure.

FIG. 8 is a schematic structural diagram of an information presentation apparatus provided by an embodiment of the present disclosure. The apparatus can be implemented by software and/or hardware, and can be generally integrated into an electronic device. As shown in FIG. 8, the apparatus includes:

a presentation module 801 for presenting at least two initial information cards on an information stream page, the information stream page comprising a plurality of rows consisting of the initial information cards, and at least one of the plurality of rows consisting of two or more said initial information cards;

a slide-out module 802 for determining, in response to a first slide operation in a preset direction, a to-be-moved-out card among the at least two initial information cards according to a target slide unit corresponding to the first slide operation, and sliding the to-be-moved-out card out of the information stream page in the preset direction;

a determination module 803 for determining at least one target information card according to the target slide unit;

a slide-in module 804 for sliding cards other than the to-be-moved-out card among the at least two initial information cards by the target slide unit in the preset direction, and sliding the at least one target information card into the information stream page in the preset direction until the at least one target information card is completely presented.

Optionally, the target slide unit includes a fixed slide distance, a real-time slide distance, or a card group. The fixed slide distance is smaller than or equal to a size of the information stream page in the preset direction.

Optionally, the slide-out module 802 is specifically used for:

determining an initial information card among the at least two initial information cards, of which at least partial region is within the target slide unit, as the to-be-moved-out card.

Optionally, the determination module 803 is specifically used for:

determining a preloaded information card among a plurality of preloaded information cards in the preset direction, of which at least partial region is within the target slide unit, as the target information card.

Optionally, there are a plurality of preloaded information cards in any one direction of the information stream page. The plurality of preloaded information cards are combined into at least one said card group according to a size of the information stream page. The card group includes at least one preloaded information card, and a size of the preloaded information card is smaller than or equal to that of the information stream page.

Optionally, when the target slide unit is a card group, the to-be-removed card includes the at least two initial information cards, and the target information card includes a preloaded information card in a next card group in the preset direction.

Optionally, the apparatus further includes a first switching module for:

in response to a second slide operation, switching in a slide direction of the second slide operation on the information stream page to present a historically presented last card group.

Optionally, the slide direction of the second slide operation is reverse to the slide direction of the first slide operation.

Optionally, the apparatus further includes a second switching module for:

in response to a third slide operation following a refresh operation, switching in the slide direction of the third slide operation on the information stream page to present a next card group in a slide direction of the third slide operation.

Optionally, the slide direction of the third slide operation is reverse to the slide direction of the first slide operation.

The information presentation apparatus provided by the embodiments of the present disclosure can execute the information presentation method provided by any embodiment of the present disclosure, and has corresponding functional modules for executing the method and beneficial effects.

An embodiment of the present disclosure also provides a computer program product, including a computer program/instruction which, when executed by a processor, implements the information presentation method provided by any embodiment of the present disclosure.

Figure 9:
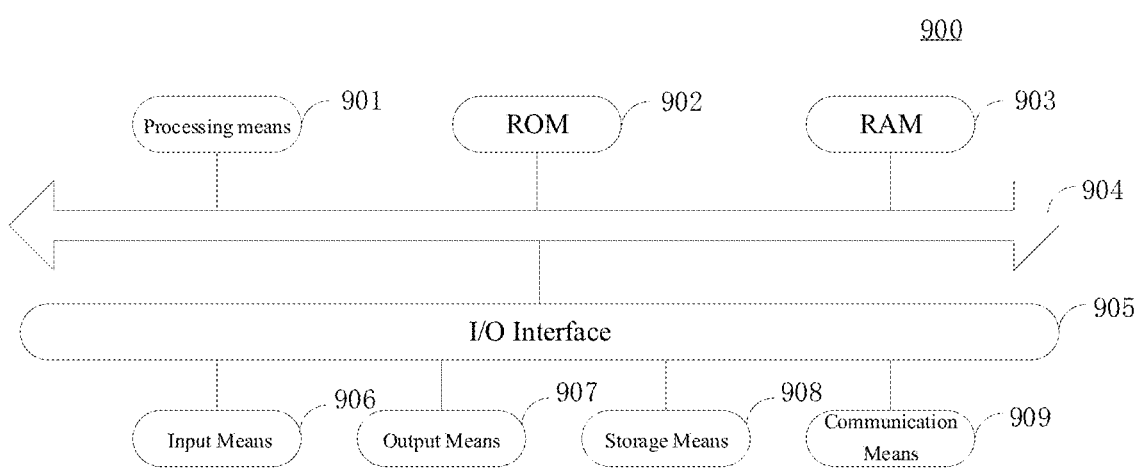
FIG. 9 is a schematic structural diagram of an electronic device provided by an embodiment of the present disclosure.

FIG. 9 is a schematic structural diagram of an electronic device provided by an embodiment of the present disclosure. Referring now specifically to FIG. 9, a schematic structural diagram adaptive for implementing an electronic device 900 in an embodiment of the present disclosure is shown. The electronic device 900 in the embodiment of the present disclosure can include, but is not limited to, a mobile terminal such as a mobile phone, a notebook computer, a digital broadcast receiver, a personal digital assistant (PDA), a tablet computer (PAD), a portable multimedia player (PMP), a vehicle mounted terminal (e.g., a vehicle mounted navigation terminal), and the like, as well as a fixed terminal such as a digital TV, a desktop computer, and the like. The electronic device shown in FIG. 9 is only an example, and should not bring any limitation to the functions and the use range of the embodiment of the present disclosure.

As shown in FIG. 9, the electronic device 900 can include a processing means (e.g., a central processor, a graphics processor, etc.) 901 that can execute various appropriate actions and processes in accordance with a program stored in a Read Only Memory (ROM) 902 or a program loaded from a storage means 908 into a Random Access Memory (RAM) 903. In the RAM 903, various programs and data necessary for the operation of the electronic apparatus 900 are also stored. The processing means 901, ROM 902, and RAM 903 are connected to each other via a bus 904. An input/output (I/O) interface 905 is also connected to the bus 904.

Generally, the following means can be connected to the I/O interface 905: an input means 906 including, for example, a touch screen, a touch pad, a keyboard, a mouse, a camera, a microphone, an accelerometer, a gyroscope, and the like; an output means 907 including, for example, a Liquid Crystal Display (LCD), a speaker, a vibrator, and the like; a storage means 908 including, for example, a magnetic tape, a hard disk, and the like; and a communication means 909. The communication means 909 can allow the electronic device 900 to perform wireless or wired communication with other devices so as to exchange data. While FIG. 9 illustrates an electronic device 900 having various means, it should be understood that not all illustrated means are required to be implemented or provided. More or fewer means can be alternatively implemented or provided.

In particular, the process described above with reference to the flow diagrams can be implemented as a computer software program, according to the embodiments of the present disclosure. For example, an embodiment of the present disclosure includes a computer program product comprising a computer program carried on a non-transitory computer readable medium, the computer program containing program code for executing the method illustrated by the flow diagram. In such an embodiment, the computer program can be downloaded and installed from a network through the communication means 909, or installed from the storage means 908, or installed from the ROM 902. When the computer program is executed by the processing means 901, the above-described functions defined in the information presentation method of the embodiment of the present disclosure are executed.

It is to be noted that the above-mentioned computer readable medium of the present disclosure can be a computer readable signal medium or a computer readable storage medium or any combination of both the above. The computer readable storage medium can be, for example, but not limited to, an electronic, magnetic, optical, electromagnetic, infrared, or semiconductor system, apparatus, or device, or any combination of the above. More specific examples of the computer readable storage medium can include, but are not limited to: an electrical connection having one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the above. In the present disclosure, the computer readable storage medium can be any tangible medium that can contain, or store a program for use by or in connection with an instruction execution system, apparatus, or device. In contrast, in the present disclosure, the computer readable signal medium can include a propagated data signal with computer readable program code carried therein, for example, in baseband or as part of a carrier wave. Such a propagated data signal can take any of a variety of forms, including, but not limited to, an electro-magnetic signal, an optical signal, or any suitable combination of the above. The computer readable signal medium can also be any computer readable medium other than the computer readable storage medium and can communicate, propagate, or transport a program for use by or in connection with an instruction execution system, apparatus, or device. Program code embodied on a computer readable medium can be transported using any suitable medium, including but not limited to: electrical wires, optical cables, RF (radio frequency), etc., or any suitable combination of the above.

In some embodiments, clients can communicate with servers using any currently known or future developed network Protocol, such as the HyperText Transfer Protocol (HTTP), and can be interconnected with any form or medium of digital data communication (e.g., a communication network). Examples of the communication network include a Local Area Network ("LAN"), a Wide Area Network ("WAN"), the Internet (e.g., the Internet), and a peer-to-peer network (e.g., an ad hoc peer-to-peer network), as well as any currently known or future developed network.

The above computer readable medium can be contained in the above electronic device, or can be separate and not incorporated into the electronic device.

The above computer readable medium carries one or more programs which, when executed by the electronic device, cause the electronic device to: present at least two initial information cards on an information stream page, the information stream page comprising a plurality of rows consisting of the initial information cards, at least one of the plurality of rows consisting of two or more said initial information cards; determine, in response to a first slide operation in a preset direction, a to-be-moved-out card among the at least two initial information cards according to a target slide unit corresponding to the first slide operation, and slide the to-be-moved-out card out of the information stream page in the preset direction; determine at least one target information card according to the target slide unit; and slide cards other than the to-be-moved-out card among the at least two initial information cards by the target slide unit in the preset direction, and slide the at least one target information card into the information stream page in the preset direction until the at least one target information card is completely presented.

Computer program code for executing operations of the present disclosure can be written in one or more programming languages or a combination thereof. The programming languages include but are not limited to an object oriented programming language such as Java, Smalltalk, C++, as well as a conventional procedural programming language such as the "C" programming language or similar programming languages. The program code can be executed entirely on a user computer, partly on the user computer, as a stand-alone software package, partly on the user computer and partly on a remote computer, or entirely on the remote computer or a server. In the circumstance where a remote computer is involved, the remote computer can be connected to the user computer via any type of network, including a Local Area Network (LAN) or a Wide Area Network (WAN), or can be connected to an external computer (for example, via the Internet using an Internet service provider).

The flow diagrams and block diagrams in the figures illustrate the architecture, functions, and operations of possible implementations of the system, method and computer program product according to various embodiments of the present disclosure. In this regard, each block in the flow diagrams or block diagrams can represent a module, segment, or part of code, which contains one or more executable instructions for implementing the specified logical function (s). It should also be noted that, in some alternative implementations, the functions labeled in the blocks can occur out of the order labeled in the figures. For example, two blocks shown in succession can, in fact, be executed substantially concurrently, or they can sometimes be executed in the reverse order, depending upon the function involved. It will also be noted that each or a combination of blocks of the block diagrams and/or flow diagrams can be implemented by a special purpose hardware-based system that executes the specified functions or operations, or by a combination of special purpose hardware and computer instructions.

The involved units described in the embodiments of the present disclosure can be implemented by means of software or hardware. The name of a unit does not in some cases constitute a limitation on the unit itself.

The functions described herein above can be executed, at least in part, by one or more hardware logic components. For example, without limitation, exemplary types of hardware logic components that can be used include: Field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of the present disclosure, a machine readable medium can be a tangible medium that can contain or store a program for use by or in connection with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any suitable combination of the above. More specific examples of the machine readable storage medium would include an electrical connection based on one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the above.

The foregoing description is only illustrative of the preferred embodiments of the present disclosure and the technical principles employed. It should be understood by those skilled in the art that the scope of disclosure involved in the present disclosure is not limited to the technical solution formed by a particular combination of technical features described above, but also encompasses other technical solution formed by any combination of technical features described above or equivalents thereof without departing from the spirit of the present disclosure. For example, the above features and the technical features disclosed in the present disclosure (but not limited to) having similar functions are interchanged with each other to form the technical solution.

Further, while various operations are depicted in a particular order, this should not be understood as requiring that such operations be executed in the particular order shown or in a sequential order. Under certain circumstances, multitasking and parallel processing are possibly advantageous. Likewise, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in a language specific to structural features and/or methodological acts, it should be understood that the subject matter defined in the appended Claims is not necessarily limited to the specific features or actions described above. Rather, the specific features and actions described above are exemplary forms for implementing the Claims.

What is claimed is:

1. An information presentation method, comprising:
   presenting at least two initial information cards on an information stream page, the information stream page comprising a plurality of rows consisting of the initial information cards, at least one of the plurality of rows consisting of two or more said initial information cards;
   determining, in response to a first slide operation in a preset direction, a to-be-moved-out card among the at least two initial information cards according to a target slide unit corresponding to the first slide operation, and sliding the to-be-moved-out card out of the information stream page in the preset direction;
   determining at least one target information card according to the target slide unit;
   sliding cards other than the to-be-moved-out card among the at least two initial information cards by the target slide unit in the preset direction, and sliding the at least one target information card by the target slide unit in the preset direction into the information stream page; and
   in response to a target information card not being completely presented after it is slid by the target slide unit in the preset direction, continuing sliding the target information card in the preset direction until the target information card is completely presented.

2. The method according to claim 1, wherein, the target slide unit comprises a fixed slide distance, a real-time slide distance, or a card group, and the fixed slide distance is smaller than or equal to a size of the information stream page in the preset direction.

3. The method according to claim 1, wherein, the determining a to-be-moved-out card among the at least two initial information cards according to a target slide unit comprises:
   determining an initial information card among the at least two initial information cards, of which at least partial region is within the target slide unit, as the to-be-moved-out card.

4. The method according to claim 1, wherein, the determining at least one target information card according to the target slide unit comprises:
   determining a preloaded information card among a plurality of preloaded information cards in the preset direction, of which at least partial region is within the target slide unit, as the target information card.

5. The method according to claim 2, wherein, there are a plurality of preloaded information cards in any one direction of the information stream page, the plurality of preloaded information cards are combined into at least one said card group according to a size of the information stream page, the card group comprises at least one preloaded information card, and a size of the preloaded information card is smaller than or equal to the information stream page.

6. The method according to claim 5, wherein, when the target slide unit is a card group, the to-be-moved-out card comprises the at least two initial information cards, and the target information card comprises a preloaded information card in a next card group in the preset direction.

7. The method according to claim 6, further comprising:
   in response to a second slide operation, switching in a slide direction of the second slide operation in the information stream page to present a historically presented last card group.

8. The method according to claim 7, wherein, the slide direction of the second slide operation is reverse to the slide direction of the first slide operation.

9. The method according to claim 6, further comprising:
   in response to a third slide operation following a refresh operation, switching in the slide direction of the third slide operation in the information stream page to present a next card group in a slide direction of the third slide operation.

10. The method according to claim 9, wherein, the slide direction of the third slide operation is reverse to the slide direction of the first slide operation.

11. The method according to claim 1, wherein, the initial information card or the target information card comprises at least one of videos, texts, or images.

12. An electronic device, comprising:
    a memory; and
    processor coupled to the memory, which is configured to execute an information presentation method based on instructions stored in the memory, the information presentation method comprises:
    presenting at least two initial information cards on an information stream page, the information stream page comprising a plurality of rows consisting of the initial information cards, at least one of the plurality of rows consisting of two or more said initial information cards;
    determining, in response to a first slide operation in a preset direction, a to-be-moved-out card among the at least two initial information cards according to a target slide unit corresponding to the first slide operation, and sliding the to-be-moved-out card out of the information stream page in the preset direction;
    determining at least one target information card according to the target slide unit; and
    sliding cards other than the to-be-moved-out card among the at least two initial information cards by the target slide unit in the preset direction, and sliding the at least one target information card by the target slide unit in the preset direction into the information stream page in the preset direction; and
    in response to a target information card not being completely presented after it is slid by the target slide unit in the preset direction, continuing sliding the target information card in the preset direction until the target information card is completely presented.

13. The electronic device according to claim 12, wherein, the target slide unit comprises a fixed slide distance, a real-time slide distance, or a card group, and the fixed slide distance is smaller than or equal to a size of the information stream page in the preset direction.

14. The electronic device according to claim 12, wherein, the determining a to-be-moved-out card among the at least two initial information cards according to a target slide unit comprises:
   determining an initial information card among the at least two initial information cards, of which at least partial region is within the target slide unit, as the to-be-moved-out card.

15. The electronic device according to claim 12, wherein, the determining at least one target information card according to the target slide unit comprises:
   determining a preloaded information card among a plurality of preloaded information cards in the preset direction, of which at least partial region is within the target slide unit, as the target information card.

16. The electronic device according to claim 13, wherein, there are a plurality of preloaded information cards in any one direction of the information stream page, the plurality of preloaded information cards are combined into at least one said card group according to a size of the information stream page, the card group comprises at least one preloaded information card, and a size of the preloaded information card is smaller than or equal to the information stream page.

17. A non-transitory computer readable storage medium, wherein, the storage medium stores a computer program which is used for executing an information presentation method comprising:
   presenting at least two initial information cards on an information stream page, the information stream page comprising a plurality of rows consisting of the initial information cards, at least one of the plurality of rows consisting of two or more said initial information cards;
   determining, in response to a first slide operation in a preset direction, a to-be-moved-out card among the at least two initial information cards according to a target slide unit corresponding to the first slide operation, and sliding the to-be-moved-out card out of the information stream page in the preset direction;
   determining at least one target information card according to the target slide unit; and
   sliding cards other than the to-be-moved-out card among the at least two initial information cards by the target slide unit in the preset direction, and sliding the at least one target information card by the target slide unit in the preset direction into the information stream page in the preset direction; and
   in response to a target information card not being completely presented after it is slid by the target slide unit in the preset direction, continuing sliding the target information card in the preset direction until the target information card is completely presented.

18. The non-transitory computer readable storage medium according to claim 17, wherein, the target slide unit comprises a fixed slide distance, a real-time slide distance, or a card group, and the fixed slide distance is smaller than or equal to a size of the information stream page in the preset direction.

19. The non-transitory computer readable storage medium according to claim 17, wherein, the determining a to-be-moved-out card among the at least two initial information cards according to a target slide unit comprises:
   determining an initial information card among the at least two initial information cards, of which at least partial region is within the target slide unit, as the to-be-moved-out card.

20. The non-transitory computer readable storage medium according to claim 17, wherein, the determining at least one target information card according to the target slide unit comprises:
   determining a preloaded information card among a plurality of preloaded information cards in the preset direction, of which at least partial region is within the target slide unit, as the target information card.

* * * * *